United States Patent [19]

Wanner et al.

[11] 4,312,106

[45] Jan. 26, 1982

[54] PROCESS FOR APPLYING A HEAT-BARRIER LAYER TO A PISTON CROWN

[75] Inventors: Hans Wanner, Herisau; Kurt Boppart, St. Gallen, both of Switzerland

[73] Assignee: Fritz Haug AG, St. Gallen, Switzerland

[21] Appl. No.: 115,779

[22] Filed: Jan. 25, 1980

[30] Foreign Application Priority Data

Mar. 15, 1979 [CH] Switzerland ........................ 2449/79

[51] Int. Cl.³ .............................................. B23P 15/10

[52] U.S. Cl. ............................... 29/156.5 R; 264/267; 92/212

[58] Field of Search ............. 29/156.5 R, 527.1–527.6; 264/259, 267, 268, 275, 276, 279; 92/212, 213, 223, 224, 248; 123/193 P

[56] References Cited

U.S. PATENT DOCUMENTS

| | | | |
|---|---|---|---|
| 1,462,084 | 7/1923 | Corser | 92/212 |
| 1,490,849 | 4/1924 | Philip | 92/212 |
| 1,593,265 | 7/1926 | Kunee | 165/DIG. 8 |
| 2,810,935 | 10/1957 | Gaydebouroff | 264/259 |
| 2,817,562 | 12/1957 | Fleming et al. | 92/212 |
| 2,984,895 | 5/1961 | Griffin, Jr. et al. | 29/402.18 |
| 3,000,676 | 9/1961 | Cheney et al. | 92/213 |
| 3,149,409 | 9/1964 | Maruhn | 123/193 P |
| 3,362,057 | 1/1968 | Kubera et al. | 29/527.2 |
| 3,915,074 | 10/1975 | Bristow et al. | 92/248 |
| 3,988,413 | 10/1976 | Gaudet et al. | 264/267 |
| 4,021,524 | 5/1977 | Grimsley | 264/267 |

FOREIGN PATENT DOCUMENTS

| | | | |
|---|---|---|---|
| 402349 | 9/1924 | Fed. Rep. of Germany | 29/156.5 R |
| 716600 | 12/1941 | Fed. Rep. of Germany | 29/156.5 R |
| 731631 | 2/1943 | Fed. Rep. of Germany | 29/156.5 R |
| 1933520 | 8/1970 | Fed. Rep. of Germany | 29/156.5 R |
| 2206033 | 8/1973 | Fed. Rep. of Germany | 92/224 |
| 539569 | 9/1941 | United Kingdom | 29/156.5 R |

*Primary Examiner*—Daniel C. Crane

*Attorney, Agent, or Firm*—William R. Hinds

[57] ABSTRACT

The piston of a piston-type machine has on its surface a heat-barrier layer of plastic material which is cast into a recess formed in the piston crown. A pouring means formlockingly enclosing the upper edge is put on the piston, held in a vertical position, to permit the recess to be overfilled with the material. The pouring means is removed after the material has hardened. Due to the shrinkage of material when the material hardens, the material and the upper edge form a flat surface on the piston.

4 Claims, 3 Drawing Figures

PROCESS FOR APPLYING A HEAT-BARRIER LAYER TO A PISTON CROWN

FIELD OF THE INVENTION

This invention relates to a process for applying a heat-barrier layer of plastic material to the crown of a piston of piston-type machines, in particular piston compressors, and to a piston having such a heat-barrier layer.

BACKGROUND OF THE INVENTION

Cooling problems which occur in piston-type compressors are well known. In particular special heat problems occur in dry-operation compressors wherein the pistons slide on guide and compression rings of large surface area which comprise PTFE (Teflon). Heat acting on the piston from the direction of the piston crown has a negative influence on the anti-friction properties of the piston rings, reduces the service life thereof, and, in the extreme case, results in damage to the piston rings.

Problems with heat also occur in connection with the piston of internal combustion engines and attempts have already been made, at a relatively early date, for satisfactory solutions to such problems.

PRIOR ART

German Patent Specification No. 731,632 discloses a piston whose piston crown is provided with an insert of quartz glass. Another proposal is disclosed in DAS No. 11 48 813 wherein a heat-barrier layer of mineral substances is cast into the piston crown. The previously known pistons with a heat-barrier layer on the piston crown, and the methods for the production thereof, suffer from various disadvantages. The methods of producing the heat-barrier layer are generally complicated and therefore increase the manufacturing costs. Furthermore, problems occur due to the differences in the coefficient of expansion of the piston and the rigid barrier layer.

An object of the present invention is to avoid the disadvantages of the known art and to provide a process for applying a heat-barrier layer to a piston crown, which is of low cost and which can be carried out without expensive equipment. A further object of the invention is to provide a piston with a heat-barrier layer which is durably connected to the piston crown and which provides sufficient protection from the effect of heat in the lower parts of the piston.

SUMMARY OF THE INVENTION

According to the invention, the piston crown is firstly provided with a recess for receiving the heat-barrier layer, a pouring means is disposed on the piston crown in a vertical position, these pouring means positively embracing the piston crown at its periphery and extending at least to the recess so as to form a container-like configuration, the recess in the piston crown is then filled with a liquid plastic material which undergoes a reduction in volume when it solidifies, until the level of the pouring material, of which the radial expansion is restricted by the pouring means, is higher than the upper edge of the piston crown before the material solidifies, and the pouring means is removed after the pouring material has solidified.

This process may be performed easily, in the optimum manner, and the only equipment that it requires is a pouring means which permits the recess to be filled with the pouring material. The recess in the piston crown can be produced when the piston itself is being manufactured. The pouring means limits the degree of expansion of the pouring material and permits the recess to be filled beyond the upper edge of the piston crown. In this way, the reduction in the volume of material, which occurs when the pouring material cools, can be previously calculated so that the surface of the material after cooling is at approximately the same level as the upper edge of the piston crown. The pouring means also ensures that the material does not flow over the upper edge of the piston crown, and does not foul the side wall of the piston. After the pouring means has been removed, the piston generally does not require any further processing operation and the heat-barrier layer is firmly connected to the piston crown.

The process may be carried into effect in a particularly simple manner, if the casting material used is a silicone rubber. Silicone rubber may be easily processed and has good properties in regard to heat insulation.

The pouring means advantageously comprises a ring of which the inside diameter, in the region which accommodates the plastic material, is adapted to the outside diameter of the recess in the piston crown. When the tolerances are suitably selected, the relatively viscous material cannot penetrate between the pouring means and the outside wall of the piston. In order to ensure that the ring lies uniformly on the piston crown, the ring is advantageously provided with a support shoulder at which it can bear against the upper edge of the piston. Depending on the size of the support shoulder, the radial expansion of the pouring material can be selectively restricted by the shoulder.

Particularly good results can be achieved with a recess which is of an approximately frustoconical configuration, with side walls which extend upwardly at an inclined angle. This configuration ensures that the material can easily expand, while also preventing air cavities or gaps. In order to ensure that the heat-barrier insert does not extend to the outside wall of the piston, the diameter of the recess, at the upper surface of the piston crown, is advantageously smaller than the outside diameter of the piston. The resulting narrow edge portion of material at the upper edge of the piston crown can be used at the same time for the shoulder of the pouring means to bear thereagainst. In order to ensure a sufficient degree of heat insulation, the axial height of the recess is preferably at least 1 mm. This thickness of layer also permits a clean casting operation and ensures sufficient heat insulation, at small piston diameters.

BRIEF DESCRIPTION OF THE DRAWINGS

In the accompanying drawings:

Referring to FIG 1, a piston 4 slides in a piston bore housing 1 on piston rings 5 of plastic material. The piston bore housing 1 is closed by a cover member 2 which has valve apertures 3, depending on the type of construction. The piston and the piston bore housing normally comprise aluminium or another light metal alloy. The piston rings 5 comprise alloyed, heat-resistant PTFE (Teflon). In order to protect the piston rings 5 from the heat which is produced in the compression chamber 8, the piston crown 13 is provided with a heat-barrier insert 7. The heat-barrier insert advantageously comprises a silicone rubber material. It will be appreciated that other pourable materials such as for example synthetic resin can also be used.

FIG. 2 shows a view in cross-section through part of the piston crown 13 directly after the operation of filling the pouring material 14 into the recess in the piston crown, but before the material 14 has set. In order to ensure the maximum adhesion of the material 14 in the recess 6, the recess 6 should have a relatively rough surface. This is achieved for example by roughing, without additional surface treatment. The pouring means 9 comprises a simple ring which engages around the outside wall 10 of the piston crown 13 and forms an extension to the upper edge 15 of the piston, thereby forming a vessel-like configuration. On its inside, the pouring means 9 has a support shoulder 12, the underside of which lies on the upper edge 15 of the piston crown 13. The recess 6 is of an approximately frustoconical configuration, thereby forming an annular bead portion 11 at the outside of the upper edge of the piston. It will be appreciated that the recess 6 may be of any other configuration. Thus it would be possible for example for the piston crown 13 to have a plurality of concentric, circular grooves, for applying the heat-barrier layer. In order to ensure that the heat-barrier layer does not extend to the outside wall 10 of the piston crown 13, the diameter d at the upper surface of the piston crown 13 is advantageously smaller than the outside diameter of the piston. The support shoulder 12 of the pouring means 9 can at the same time bear against the resulting annular surface formed at the upper edge 15 of the piston. Particularly good results can be achieved if the inside diameter of the support shoulder 12 corresponds to the diameter d of the recess 6.

Figure 1:
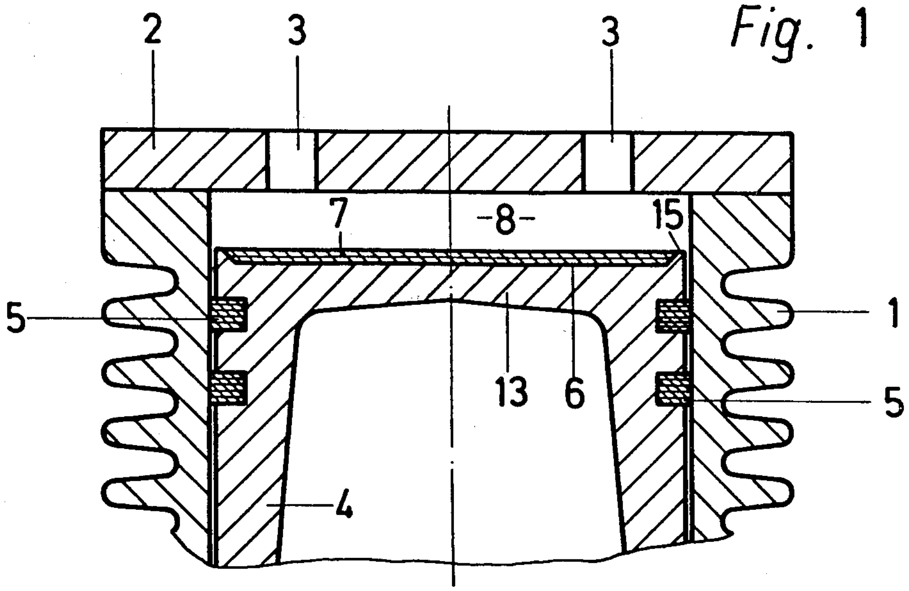
FIG. 1 shows a simplified view in cross-section through a piston in the piston bore.
Figure 2:
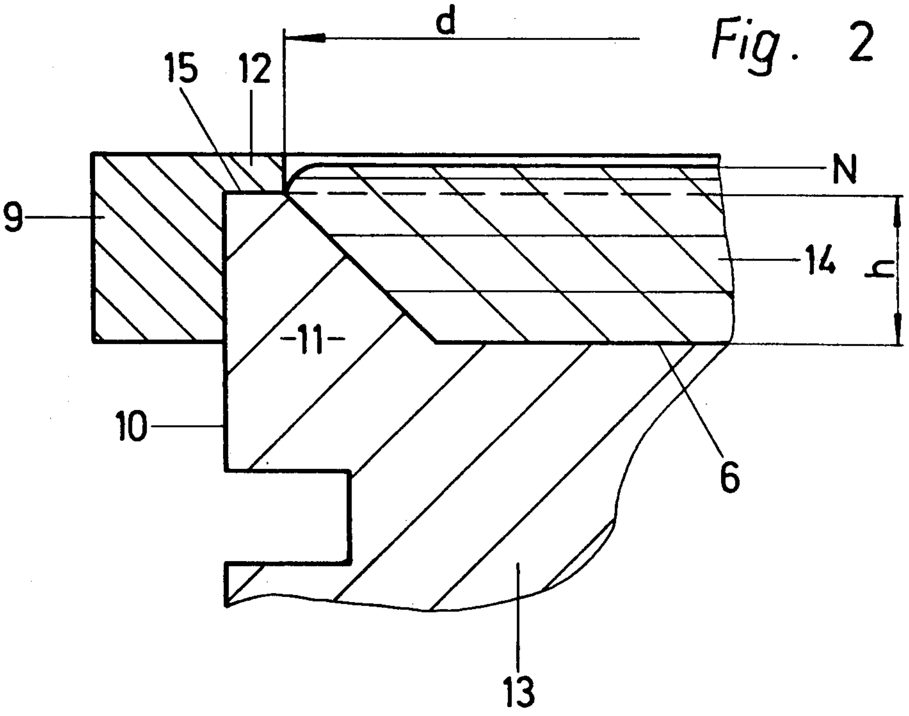
FIG. 2 shows a view on an enlarged scale and in cross-section of part of the piston crown.
Figure 3:
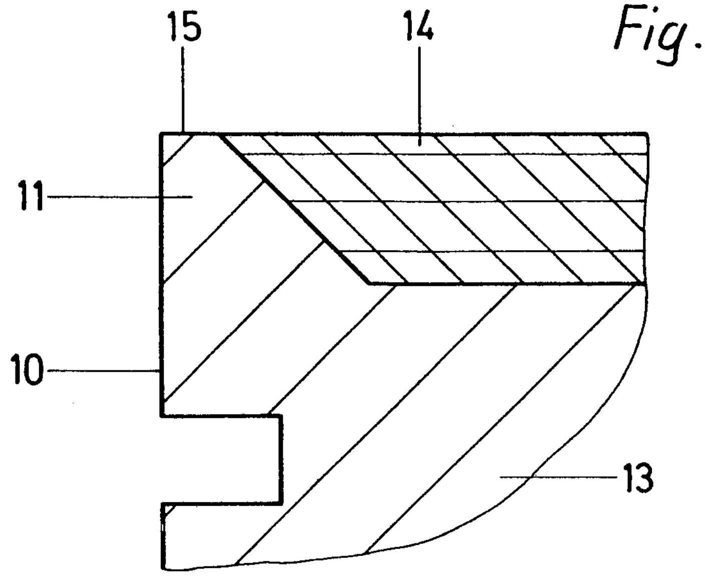
FIG. 3 shows the piston crown of FIG. 2, after the plastic material has solidified.

A reduction in the volume of material occurs when the pouring material 14 solidifies. This reduction in volume would result in the surface of the material 14 being curved inwardly at the centre line of the piston, after the material had cooled. Therefore, when the recess 6 is being filled with material, the recess is filled up to a predetermined level N above the upper edge 15 of the piston. The shoulder 12 of the pouring means 9 restricts radial expansion of the material 14 in the pouring operation. The axial height of the shoulder 12 is advantageously such that it approximately corresponds to the probable level N of the material 14 to be filled into the recess. In this way, for example, by using a straight edge, the material 14 can be scraped smooth by scraping off across the top of the shoulder 12. The reduction in the volume of material when the material 14 cools and dries may be precalculated so that the surface of the material 14 after setting thereof is at the same level as the upper edge 15 of the piston crown. Depending on the nature of the material 14, the pistons are left at rest for about 6 to 12 hours after the material 14 has been poured into the recess, before the pouring means 9 is removed. There is no need for subsequent processing or machining of the piston surface. The surface of the insert 7 then forms a jointless transition to the upper edge 15 of the piston, as can be seen from FIG. 3.

It will be appreciated that modifications in the abovedescribed example are possible without thereby departing from the scope of the accompanying claims. Thus it would be possible for example for the ring of the pouring means 9 to be replaced by a means subdivided into a plurality of segment-like jaws. Instead of the ring, the outside wall 10 could also be enclosed by a stable foil, at the upper edge 15 of the piston. It would also be possible for hardening of the material 14 to be accelerated by suitable means.

We claim:

1. A process for applying a heat-barrier layer of plastic material to the crown of the piston for a piston-type machine, in particular a piston-type compressor, said piston having a circumferential outside wall comprising providing the piston crown with a recess for receiving the heat-barrier layer, disposing a pouring means on the piston crown in a vertical position, said pouring means positively embracing the piston crown at its periphery and having a shoulder extending inwardly from the circumferential outside wall of the piston at least to the recess so as to form a container-like configuration circumscribing said recess, filling the recess in the piston crown with a liquid plastic material which undergoes a reduction in volume when it solidifies, continuing said filling until the level of the pouring material, whose radial spread is restricted by the pouring means, is higher than the upper edge of the piston crown before the material solidifies, and removing said pouring means after the pouring material has solidified.

2. A process as defined in claim 1, wherein the recess in the piston crown is filled with silicone rubber.

3. A process as claimed in claim 1 wherein the level of the liquid plastic material above the upper surface of the piston crown before solidification is predetermined based on the reduction in volume upon solidification such that the surface of the material after solidification is at substantially the same level as the upper surface of the piston crown.

4. A process as claimed in claim 3 wherein the recess is of inverted frustoconical configuration with sidewalls which extend upwardly at a divergent angle.

* * * * *